July 12, 1955

W. F. ALLER 2,712,695

GAUGE BLOCK

Filed May 1, 1953

2 Sheets-Sheet 1

INVENTOR.
W. F. Aller
BY Edward J. Noig
atty

July 12, 1955     W. F. ALLER     2,712,695
GAUGE BLOCK
Filed May 1, 1953     2 Sheets-Sheet 2
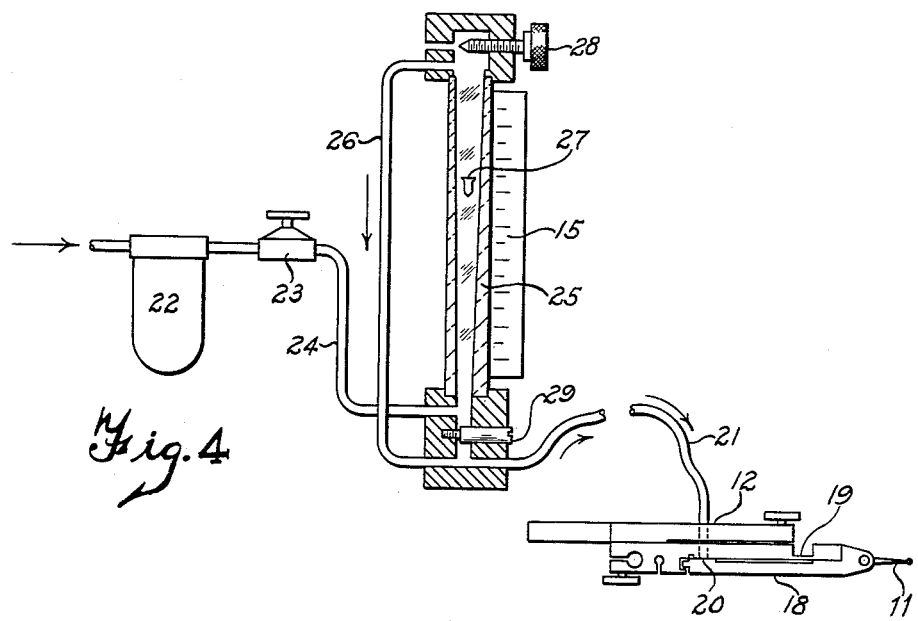
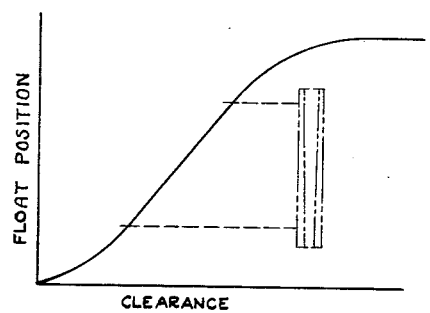
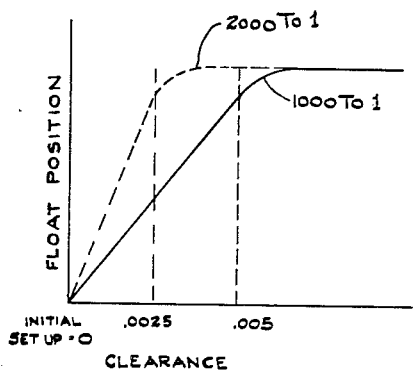

United States Patent Office 2,712,695
Patented July 12, 1955

2,712,695
GAUGE BLOCK

Willis Fay Aller, Dayton, Ohio, assignor to The Sheffield Corporation, Dayton, Ohio, a corporation of Ohio Application May 1, 1953, Serial No. 352,517

4 Claims. (Cl. 33—168)

This invention relates to a set-up and calibrating means for dimension gauges. The gauge setting and checking block of this invention is disclosed in application S. N. 336,295 filed by Eickman February 11, 1953 and assigned to the assignee of this invention.

It is an object of this invention to provide a gauge setting block having a sloped, calibrated surface whereby predetermined displacements can be readily obtained by associating the gauge with different points along the calibrated surface in set-up procedures.

It is a further object to provide a gauge setting block of the character referred to wherein the gauge can be caused to smoothly approach a given dimension by relative movement between the gauge and the setting block along the sloping surface whereby jumpiness and hysteresis of the gauge can be readily detected.

It is a further object to provide a gauge setting block of the character referred to having calibrations along its sloping surface adapting a single block for setting up or checking gauges of different amplifications and scale ranges.

It is a further object to provide a range setting block of the character referred to for use in setting up a gauge of the air flow type using float position along an internally tapered flow tube as its indicating means and being characterized by a linear response of the indicating element along the tube length beginning with a given initial orifice clearance with the indicator at the lower end of the tube, the block having calibrations along its sloping surface for use in obtaining this initial clearance and conditioning the gauge in its linear response range and adjacent the lower end thereof.

Figure 1:
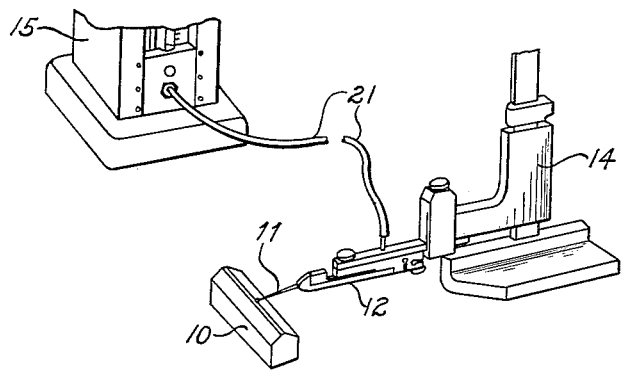
Figure 3:
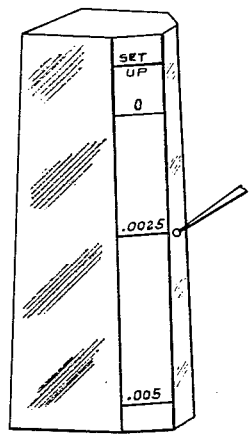
Figure 2:
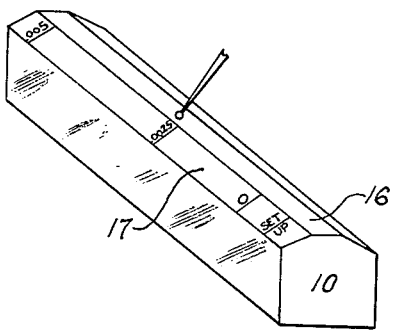

Other objects and advantages of the invention will be apparent from the following description, the appended claims, and the accompanying drawing, in which, Figure 1 shows a setting block embodying the present invention associated with a gauge, Figure 2 illustrates a setting block on an enlarged scale embodying the present invention adapted for mounting on horizontal surfaces and having calibrations along its upper sloped surface, Figure 3 shows a modified setting block having its calibrations along a surface sloped slightly with respect to vertical, Figure 4 shows a gauge of the type wherein the flow through an orifice is controlled by the positioning of a work contactor, Figure 5 is a graph of orifice clearance versus indicator response for such a gauge, and Figure 6 is a float position-orifice clearance graph with curves plotted thereon for different amplifications.

In setting up precision gauges for gauging operations it has been the previous practice to utilize gauge-block build-ups or precisely fashioned masters to insure that the set-up dimensions gauged differ by precise predetermined amounts. This is necessary so that gauge adjustments such as those involving indicator position and amplification can be made or checked or limit indicators properly placed to show tolerance limits. Besides the obvious time consumption and possible errors in multiple gauge block build-ups and the expense of the masters involved in these previous practices it has been almost impossible to be sure that the gauge will approach a given dimension smoothly in order that hysteresis and jumpiness of the gauge itself can be readily detected in view of the jump from block to block or master to master.

The gauge block of the present invention has a sloping calibrated surface whereby a plurality of differences in dimension can be provided in a single setting block and utilized by direct readings of the calibrations or interpolation therebetween. The block can also be used for setting up gauges having different amplifications and ranges. By sliding the tapered block along a reference surface relative to the gauge, the gauge can be caused to smoothly approach any dimension in the range of the gauge block.

This setting block has particular application to setting up gauges of the type wherein air leakage flow through a work controlled leakage orifice is indicated by a float positioned in accordance with the controlled flow through an internally tapered tube, and in which both amplification and float positioning adjustments are provided. Basically the amplification and range are determined by the taper and length of the developed section of the tube. The response in fluid flow as orifice clearance increases is not linear. A flow tube has been provided in such gauges having an internal taper so developed as to give linear float response along the tube length as clearance (and flow) increases when the float begins from an initial position adjacent the lower (and smaller internal) portion of the developed section, if there is a given initial orifice clearance. The gauge block of this invention provides calibrations for readily obtaining this initial clearance and further calibrations for checking or setting the float position and amplification adjustments.

As an illustrative example, the features and utilization of the present invention have been set forth more specifically below as applied to a work controlled air flow gauge of the type referred to above. The teachings of this invention can be used in providing setting blocks for gauges of different types, although it is herein described as used with an air gauge having a pivoted work contactor controlling a leakage orifice.

The major components of an exemplary gauge used in disclosing the construction and utility of the present invention are illustrated in Figure 1 and comprise a gauge head 12 having a work contactor 11 and a flow measuring instrument 15. The gauge head 12 is supported on a stand 14 for vertical adjustment relative to a gauge setting block embodying the present invention.

In Figure 4 the flow measuring instrument 15 is shown in more detail and in section and in that figure the instrument is connected to a gauge head such as that previously indicated in reference to Figure 1. In the exemplary gauge of Figure 4, movements of the work contactor 11 pivot an arm 18 about a fulcrum point 19 formed by a reduced section in the gauge head. Movements of the arm 18 carry an orifice controlling surface 20 toward and from an orifice outlet contained in the gauging device 12 at the end of the tube 21 thus controlling the orifice clearance and the flow through the conduit 21 and through the flow measuring instrument 15 to which the conduit is connected. Air is supplied for gauging purposes through a filter 22, a regulator 23, and a conduit 24 which leads to the flow measuring instrument. The measuring instrument includes a vertically disposed transparent tube 25 which has an internally tapered passage mounted with its large end at the upper end of the instrument 15. Air passes from conduit 24 through the transparent tube 25 and a conduit 26 which joins the conduit 21 leading to the gauging device. A float element 27 located in the transparent tube 25 will position itself vertically in accordance with the velocity of flow, which velocity is in turn controlled by the displacement of the work contactor point. Accordingly, the flow measuring instrument 15 can include a scale calibrated for dimensions and the float 25 will act as indicator thereof. At the upper end of the instrument is a knob 28 which can be adjusted to allow any desired amount of air to reach the atmosphere without passing through the gauging device 12. This permits the float 27 to be arranged in the tube at will for any particular flow. An additional adjustment is shown at 29 and this controls an adjustable bypass valve. By this adjustment 29 any desired proportion of the air supplied through conduit 24 can be passed directly to the gauge head 12 without going through the transparent tube 25. This adjustment controls the amplification of the instrument.

In Figure 5 there is shown a graph having plotted thereon a line indicating generally the relationship of float or indicator response if a flow tube of sufficient length to take care of the whole range of clearance were employed with only a central portion thereof developed to make the response linear. As a matter of practice the tube is not made that long but is fashioned generally as shown schematically in Figure 5 to utilize only the central section of the curve for indication purposes. Because of this the float must be positioned at the lower end of the tube with a given initial clearance of the gauging leakage orifice; responses of the float in the tube from there up along the developed tube section would then be linear for increased orifice clearances. As previously mentioned the amplification of the flow measuring instruments is basically determined by the internal taper of the tube used. Fine adjustments of amplification can be made by adjusting the amplification means as indicated at 29 in Figure 4.

Figure 6 shows the float position-clearance relationship for two tubes of different amplifications. For example, these amplifications may be 1000 to 1 and 2000 to 1. Each curve begins at its lower end with an initial orifice clearance and a float position at the lower end of the developed tube section. Each tube has the same effective length. For an amplification of 2000 to 1 an orifice clearance of .0025 inch is spread along the length of the tube; for an amplification of 1000 to 1 an orifice clearance of .005 inch is spread along the length of the tube.

Referring to Figure 2, wherein is shown a gauge block embodying the present invention, it will be noted that the block has an upper sloped surface having horizontal and vertical components and calibrations therealong reading "setup," "0," ".0025" and ".005" from the lower to the upper end thereof. When a work contactor is placed in contact with the sloping surface 16 of the block 10, with the orifice initially closed and moved between the "setup" to "0" calibrations along the horizontal component on the calibrated surface 17, it would have a displacement along the vertical component giving predetermined initial clearance at which the float should be positioned adjacent the lower end of the linear tube response range. Then if the float is positioned at the lower end with the work contactor at the "0" point the gauge is conditioned for linear response. Between "0" and ".0025" calibrations the work contactor would be given a vertical component of movement of .0025 inch and this would correspond to the effective range of a tube with 2000 to 1 amplification. Between "0" and ".005" the work contactor would be given a vertical component movement of .005 inch and this is the effective range of the 1000 to 1 instrument. Thus it is seen that the block can be used to set up and check instruments of two different amplifications in the illustrative embodiment. It is now believed that the basic purpose of the block is apparent and that the following described setup procedure as the block would be applied to an instrument of 1000 to 1 amplification can be understood.

The gauge head 12 is mounted on the stand 14 initially with its orifice in a closed position and with no contact with the setting block. The float positioning adjustment 28 of the instrument is turned until the float can be seen in the transparent tube. The gauge head is then gradually lowered by using the adjustment of the stand 14 until the work contactor touches the "setup" point on the gauge block 10. This will be indicated by a very slight float rise. The gauge head is fixed at that height. The gauge block 10 is then slid along the same reference plate on which is located the stand 14 until the work contactor 11 is in contact with the "0" point of the gauge block. The orifice has now been opened the required predetermined initial amount. With an instrument furnished with a scale zero calibration centered and a range of .005 inch of indication, the float would be positioned by using the float adjustment 28 while the work contactor contacts the point "0" on the block until the indicator is at .0025 below the scale zero and adjacent the lower end of its linear response range. Then the block would be slid relative to the work contactor until the contactor is at the point ".005" of the block. If the instrument is properly adjusted as to amplification the float should then indicate .0025 above zero on the instrument scale. This furnishes a means for checking the amplification of the instrument; however, if the amplification is not properly adjusted the block can be moved between its "0" and ".005" calibrations and the instrument amplification properly adjusted. Thus it is seen that using the gauge block of this invention the setup clearance for the particular tube design is readily and accurately achieved and the amplification of the instrument is quite rapidly checked or adjusted. A similar procedure would be carried out with an instrument of 2000 to 1 amplification and the graduations along the calibrated surface 17 between "0" and ".0025."

Then to use the instrument for some particular height measurement it is merely necessary to properly position the gauge head on the supporting stand.

The block illustrated in Figure 3 is a further application of the invention previously discussed and is used when a gauging device is to be set up for measuring horizontal displacements. The procedure is otherwise identical. In order to secure this block in place the block itself or its base portion can be magnetized.

Thus it is seen that a single setting block has been provided for fast and simple set-up and check of gauge instruments of various amplifications. A means has been provided in the form of one set-up block for simply placing the indicator within the linear range of its response. No gauge blocks are required in the calibration nor is a precision screw necessary.

It is understood that this invention is not limited to the precise forms illustrated but that changes may be made therein without departing from the scope of the invention which is defined in the appended claims.

What is claimed is:

1. A gauge setting block for use in setting the indicator position adjustment and the amplification of a gauge instrument controlled by a gauge head having a work contactor, said block having a flat supporting surface for mounting upon a reference surface and a flat surface sloped relative to said supporting surface adapted for contact by the work contactor, the sloped surface having horizontal and vertical components whereby relative movement between the gauge head and the setting block along one component with the work contactor in contact with the sloping surface gives a displacement of the work contactor along the second component, indicia on said block along said sloped surface, said indicia including a first indicium adjacent one end of said sloping surface, a second indicium displaced along said sloping surface from the first indicium, the displacement therebetween along the second component being coordinated with a particular gauging instrument and equalling a desired range of the gauging instrument with a particular definite amplification, and a third indicium displaced along said sloping surface beyond said second indicium, the displacement between the first and third indicia along the second component being coordinated with equalling the range of a gauging instrument with another amplification.

2. A gauge setting block for use in setting the indicator position adjustment and the amplification of a gauge having a work contactor, the gauge responding linearly through an effective range when its indicator is initially at the lower end of its range and with a predetermined initial work contactor movement, said block having a flat supporting surface upon which the block is mounted on a reference surface such as a surface plate or the like and a flat surface sloped relative to said supporting surface adapted for contact by the work contactor, the sloped surface having horizontal and vertical components whereby relative movement between the work contactor and the setting block along one component with the work contactor in contact with the sloping surface gives a displacement of the work contactor along the second component, indicia on said block relatively spaced along said sloped surface, the displacement along the second component between a first and a second indicia adjacent one end of the block being coordinated with the particular gauge and corresponding to the predetermined initial work contactor movement, and the further displacement along the second component between the second indicium and the third indicium spaced further along said sloped surface being coordinated with and equalling the range of work contactor movement for linear gauge response with a given gauge amplification.

3. A gauge setting block for use in setting the indicator position adjustment and the amplification of an air gauge having a work contactor controlling a fluid leakage orifice, the gauge responding linearly through an effective range if its indicator is initially at the lower end of its effective range and with a predetermined initial orifice clearance, said block having a flat supporting surface adapted for mounting on a surface plate or the like and a flat surface sloped relative to said supporting surface adapted for contact by the work contactor the width of the block being substantially commensurate with its height, the sloped surface having horizontal and vertical components whereby relative movement between the work contactor and the setting block along one component with the work contactor in contact with the sloping surface also being coordinated with the particular air gauge and gives a displacement of the work contactor along the second component and proportionate orifice clearances, indicia on said block relatively spaced along said sloped surface, the displacement along the second component between a first and second indicia adjacent one end of the block being coordinated with the particular air gauge and corresponding to the work contactor movement necessary to produce the predetermined initial orifice clearance, and the further displacement along the second component between the second indicium and a third indicium spaced further along said sloped surface equalling a desired range of work contactor movement with a given gauge amplification.

4. A gauge setting block for use in setting the indicator position adjustment and amplification of an air gauge having a pivoted work contactor controlling a fluid leakage orifice, the gauge responding linearly through an effective range if its indicator is initially at the lower end of its effective range and with a predetermined initial orifice clearance, said block having a flat supporting surface upon which the block is mounted on a horizontal surface such as a surface plate or the like and a flat surface slightly inclined relative to said supporting surface adapted for contact by the work contactor, whereby relative horizontal movement between the work contactor and setting block along the work contactor pivot axis with the work contactor in contact with the inclined surface gives a vertical displacement of the work contactor about its pivot axis and proportionate orifice clearances, indicia on said block relatively spaced along said inclined surface, the vertical displacement between a first and second indicia adjacent one end of the block being coordinated with the particular gauging components and corresponding to the work contactor movement necessary to produce the predetermined initial clearance, and the further vertical displacement between the second indicium and a third indicium spaced further along the inclined surface being coordinated with and equalling a desired range of work contactor movement with a given gauge amplification.

References Cited in the file of this patent

UNITED STATES PATENTS 527,581  Benson ---------------- Oct. 16, 1894

OTHER REFERENCES

Clarkator catalogue, Clark Instrument, 10200 Ford Rd., Dearborn, Mich.